US012212694B2

(12) United States Patent
Sequino et al.

(10) Patent No.: US 12,212,694 B2
(45) Date of Patent: *Jan. 28, 2025

(54) SYSTEMS AND METHODS FOR CENTRALLY MANAGING AND ROUTING MULTIPLE CREDENTIALS

(71) Applicant: INTEGRITY Security Services LLC, Santa Barbara, CA (US)

(72) Inventors: David R. Sequino, Leesburg, VA (US); Amit Kapoor, San Francisco, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,997

(22) Filed: Oct. 20, 2023

(65) Prior Publication Data

US 2024/0048396 A1    Feb. 8, 2024

Related U.S. Application Data

(63) Continuation of application No. 18/299,180, filed on Apr. 12, 2023, now Pat. No. 11,818,280.

(60) Provisional application No. 63/330,026, filed on Apr. 12, 2022.

(51) Int. Cl.
   *H04L 9/32* (2006.01)
(52) U.S. Cl.
   CPC ................... *H04L 9/3268* (2013.01)
(58) Field of Classification Search
   CPC ................................................. H04L 9/3268
   See application file for complete search history.

(56) References Cited

U.S. PATENT DOCUMENTS

| | | | |
|---|---|---|---|
| 7,290,133 B1 | 10/2007 | Montgomery | |
| 10,581,620 B2 | 3/2020 | Meyer et al. | |
| 10,623,921 B2* | 4/2020 | Stählin | H04L 63/0823 |
| 10,750,512 B2* | 8/2020 | Lee | H04W 28/02 |

(Continued)

OTHER PUBLICATIONS

Rodriquez, K. (Examiner), International Search Report and Written Opinion dated Jul. 6, 2023, PCT Application No. PCT/US2023/18254.

(Continued)

*Primary Examiner* — Yonas A Bayou
(74) *Attorney, Agent, or Firm* — MH2 Technology Law Group, LLP

(57) ABSTRACT

Systems, methods, and computer-readable media for managing digital certificates and other security credentials. A routing and management server is communicatively connected to a certificate user device and to a plurality of certificate generators. The server performs operations that may include: optionally registering the certificate user device; receiving a request for one or more digital certificates from the certificate user device; analyzing the request to determine an appropriate certificate generator, from among the plurality of certificate generators, for producing the one or more digital certificates; optionally translating the request into a format required by the appropriate certificate generator; transmitting the request to the appropriate certificate generator; receiving the one or more digital certificates from the appropriate certificate generator; and providing the one or more digital certificates to the certificate user device.

30 Claims, 3 Drawing Sheets

(56) References Cited

U.S. PATENT DOCUMENTS

| | | | |
|---|---|---|---|
| 10,803,681 B2 * | 10/2020 | Ravi | H04W 12/71 |
| 10,805,395 B2 * | 10/2020 | Cavalcanti | H04W 4/44 |
| 10,872,523 B2 * | 12/2020 | Maeda | G08G 1/0129 |
| 10,880,812 B2 * | 12/2020 | Russell | H04W 12/069 |
| 11,019,052 B2 * | 5/2021 | Lasynetskyi | G05D 1/0055 |
| 11,153,101 B2 | 10/2021 | Meyer et al. | |
| 11,177,966 B2 * | 11/2021 | Lee | H04L 63/0823 |
| 11,251,971 B2 * | 2/2022 | Way | H04W 12/069 |
| 11,290,884 B2 * | 3/2022 | Kim | H04W 48/02 |
| 11,483,163 B2 * | 10/2022 | Angus | H04L 9/3263 |
| 11,563,590 B1 | 1/2023 | Amazon | |
| 2006/0206707 A1 | 9/2006 | Kostal et al. | |
| 2008/0028208 A1 * | 1/2008 | Bolcer | G06F 21/10 |
| | | | 713/156 |
| 2016/0087804 A1 * | 3/2016 | Park | H04L 9/3268 |
| | | | 713/156 |
| 2017/0230355 A1 | 8/2017 | Citrix | |
| 2021/0120404 A1 | 4/2021 | Huawei | |
| 2022/0038295 A1 | 2/2022 | Meyer et al. | |
| 2023/0327889 A1 | 10/2023 | Sequino et al. | |

OTHER PUBLICATIONS

Notice of Allowance dated Jul. 10, 2023, US Application No. 18/299, 180, 15 pages.

* cited by examiner

SYSTEMS AND METHODS FOR CENTRALLY MANAGING AND ROUTING MULTIPLE CREDENTIALS

CROSS-REFERENCE TO RELATED APPLICATIONS

This application is a continuation of U.S. application Ser. No. 18/299,180 filed on 12 Apr. 2023, which claims the benefit of, and priority to, U.S. Provisional Application No. 63/330,026 filed on Apr. 12, 2022, all of which are hereby incorporated by reference in their entireties.

BACKGROUND

This invention relates to the systems, devices, computer applications, and methods for securely and centrally managing and generating digital assets, and in particular, security infrastructure credentials such as digital certificates (e.g., public key infrastructure certificates).

The computers in computerized devices operate according to their software and/or firmware and data. In order to ensure safe and proper operation, the computerized devices must be properly initialized and periodically updated with the proper software, firmware, executable instructions, digital certificates (e.g., public key infrastructure certificates), cryptographic keys and the like (hereinafter collectively referred to as "digital assets" or "software") as intended by the manufacturer and the ecosystem of devices in which they operate.

Most, if not all, modern vehicles and transportation machinery, (e.g., automobiles, trucks, electric vehicles, aircraft (e.g., drones), trains, watercraft, motorcycles, scooters, and the like), contain several embedded processors or embedded computers in their subsystems, and are computer-controlled in several aspects. Similarly, a growing number of modern transportation ecosystem devices (e.g., traffic lights, traffic cameras, traffic sensors, electronic traffic signs, traffic safety systems, bridge monitors, bridge control systems, and the like) contain at least one, and often many, embedded processors or embedded computer systems, and are computer-controlled in at least some aspects. These computer-controlled elements of the modern transportation ecosystem communicate with each other, passing various types of information back and forth, and they may react, respond, change their operation, or otherwise depend upon the information received/sent from/to other elements for safe, correct, efficient, and reliable operation. Recent examples of transportation ecosystems include Vehicle-to-Vehicle (V2V; Electronic Vehicle to Grid V2G; and similarly C2C, Car-to-Car, in Europe) ecosystems and Vehicle-to-Infrastructure ecosystems (V2I, and similarly C2I, Car-to-Infrastructure). V2V and V2I together are often referred to a V2X (e.g., vehicle to anything communications) ecosystem.

In the arena of connected vehicle technologies (V2V, V2G, C2C, C2I, V2X, and the like), all of the vehicles and devices in the ecosystem must use the proper security infrastructure and have current, genuine, and valid security credentials, (e.g., digital certificates) to operate in a safe, secure, and privacy-protective manner. As connected vehicle applications exchange information among vehicles, roadway infrastructure, traffic management centers, and wireless mobile devices, the ecosystem and security infrastructure ensure that users and ecosystem devices can trust in the validity of information received from other ecosystem users and devices, which are indistinct users and devices that they have never met and about which they have no information.

Problems arise, however, when a computerized device in the ecosystem has one or more invalid digital assets, such as one or more invalid security credentials (e.g., digital certificates), which may, for example, indicate that a device is unreliable and untrustworthy. These problems include that the information sent by such a device may be incorrect, untrustworthy, or unreliable. The digital certificate(s) associated with a computerized device may be invalid for any of various reasons, including expiring or timing out, or because unauthorized or malicious actors (e.g., hackers) corrupt, replace, or change the certificate(s) or the device's software.

These problems are complicated and additional problems and technical inefficiencies arise when a vehicle that contains several computerized devices and subsystems, which are typically each produced by different subsystem manufacturers, needs to update, replace, or replenish one or more of the digital certificates for one or more of its constituent computerized devices and subsystems because the digital certificate required for each subsystem device may come from a different supplier or generator of digital certificates. These additional problems and technical inefficiencies include, among other things, establishing and maintaining relationships, login credentials, accounts, etc. with each of the different suppliers or generators; establishing the correct interaction protocols with each of the different suppliers or generators; maintaining the correct interaction protocols with each of the different suppliers or generators, especially as they change over time; and lack of storage capacity for the code, etc. to implement the foregoing for a large number of different suppliers or generators.

Similar complicated problems arise when a vehicle manufacturer supplies vehicles to different countries that each employ different inter-vehicle, inter-transportation-infrastructure ecosystems, such as the V2X infrastructure in the U.S. and the C2X infrastructure in a European country, because the same model of vehicle must be able to identify and interact with a different supplier(s) (e.g., certificate generators, such as security credential management systems) and different type(s) of digital certificates depending on where the vehicle is sold or used.

Further similar problems arise in that the certificates needed by the various subsystems of a vehicle may be of different types; e.g., they may be different types of public key infrastructure (PKI) certificates. Still further similar problems arise in that the certificates needed by the various subsystems of a vehicle may be from different ecosystems and/or different security infrastructures e.g., V2X certificates, (e.g., pseudonym certificates), for the V2X ecosystem and V2G certificates for the electrical grid ecosystem.

Accordingly, it is desirable to provide improved systems, methods and techniques for securely, easily, and centrally obtaining security credentials, such as digital certificates, for devices or systems, (e.g., vehicles) that utilize multiple digital certificates, which may be provided by multiple certificate providers/generators, and which may be in multiple different formats.

Various embodiments described herein address these and other problems associated with managing multiple security credentials.

BRIEF SUMMARY

The embodiments and implementations described herein include systems, methods, and computer-readable media for managing digital certificates and other security credentials. Various embodiments include a routing and management server that is communicatively connected to a certificate user device and to a plurality of certificate generators. Various of the embodiments described herein perform functions, steps, or operations that include: optionally registering the certificate user device; receiving a request for one or more digital certificates from the certificate user device; analyzing the request to determine an appropriate certificate generator, from among the plurality of certificate generators, for producing the one or more digital certificates; optionally translating the request into a format required by the appropriate certificate generator; transmitting the request to the appropriate certificate generator; receiving the one or more digital certificates from the appropriate certificate generator; and providing the one or more digital certificates to the certificate user device.

In some embodiments, analyzing the request to determine an appropriate certificate generator comprises analyzing the request and determining a plurality of appropriate certificate generators; translating the request into a format required by the appropriate certificate generator comprises translating the request into a plurality of formats required by the plurality of appropriate certificate generators; transmitting the translated request to the appropriate certificate generator comprises transmitting the plurality of translated requests to the plurality of appropriate certificate generators; and receiving the one or more digital certificates from the appropriate certificate generator comprises receiving one or more digital certificates from the plurality of appropriate certificate generators.

In some embodiments, wherein the certificate user device is a land vehicle. In some other embodiments, the certificate user device is an aircraft.

In some embodiments, analyzing the request to determine an appropriate certificate generator comprises reading, from the received request, information that indicates the appropriate certificate generator. In some such embodiments, the information specifies a type of certificate.

In some embodiments, transmitting the translated request to the appropriate certificate generator comprises employing a communications protocol specific to the appropriate certificate generator to send the translated request.

In some embodiments, transmitting the translated request to the appropriate certificate generator comprises transmitting the translated request utilizing an enrollment certificate for the certificate user device.

In some embodiments, the operations further include enrolling, by the routing and management server, with at least one of the plurality of certificate generators; and receiving, from the at least one of the plurality of certificate generators, an enrollment certificate for the routing and management server. In some such embodiments, transmitting the translated request to the appropriate certificate generator comprises transmitting the translated request utilizing the enrollment certificate for the routing and management server.

BRIEF DESCRIPTION OF THE DRAWINGS

The accompanying drawings, which are incorporated into and constitute a part of this specification, illustrate embodiments of the invention and together with the description, serve to explain the principles of the invention.

DETAILED DESCRIPTION

Reference will now be made in detail to embodiments of the invention, examples of which are illustrated in the accompanying figures.

Various embodiments and implementations consistent with the invention provide systems, components, methods, and computer program products for centrally processing requests for multiple different types of digital asset(s) (e.g., certificates or other security credentials), translating the requests or generating equivalent requests in the appropriate format (if needed), routing the requests to the appropriate digital asset generator, and providing the newly generated, responsive digital asset(s) back to the requester.

Consider, for instance, a vehicle manufacturer that produces a new U.S. electric vehicle that must be provisioned with V2X certificates and also with a vehicle-to-grid (V2G) certificate so that the electric car can interface with the electrical power grid and the car's batteries can provide unused power to the grid. Consider further that the different technical ecosystems (e.g., V2X and V2G) employ different types of certificate formats, interfaces, communication protocols, and generators; e.g., V2G employs an X509 certificate format and interface, while V2X employs an IEEE Std 1609.2 certificate format and interface. Note similarly that the European C2C ecosystem employs an ETSI-based certificate format and interface, which would be necessary to use if the new electric vehicle were exported to Europe.

Technical problems, inefficiencies, costly software and hardware duplications, and maintenance problems arise in that the vehicle manufacturer must build, maintain, and keep up-to-date vehicle subsystems and software for two, three or more different types of security infrastructures (e.g., PKIs) during the life of the vehicle. And, vehicles will have to be updated and more certificates and security infrastructure support will be needed in the future if the vehicle adds additional capabilities or subsystems that require secure communication and provisioning.

There are currently no systems or devices that allow a certificate user (e.g., a vehicle manufacturer, the vehicle itself, etc.) to obtain, from a single centralized management system, multiple, different types of certificates (or other digital assets), which may originate from multiple, different certificate generators or producers. Various embodiments consistent with this disclosure provide the novel devices and capabilities, among others, to provide or obtain multiple different types of certificates (e.g., V2X IEEE Std 1609.2 certificates, V2G X509 certificates, C2C ETSI-standard certificates, etc.), which may come from multiple, different certificate generators or producers, via a centralized routing and management system.

Figure 1:
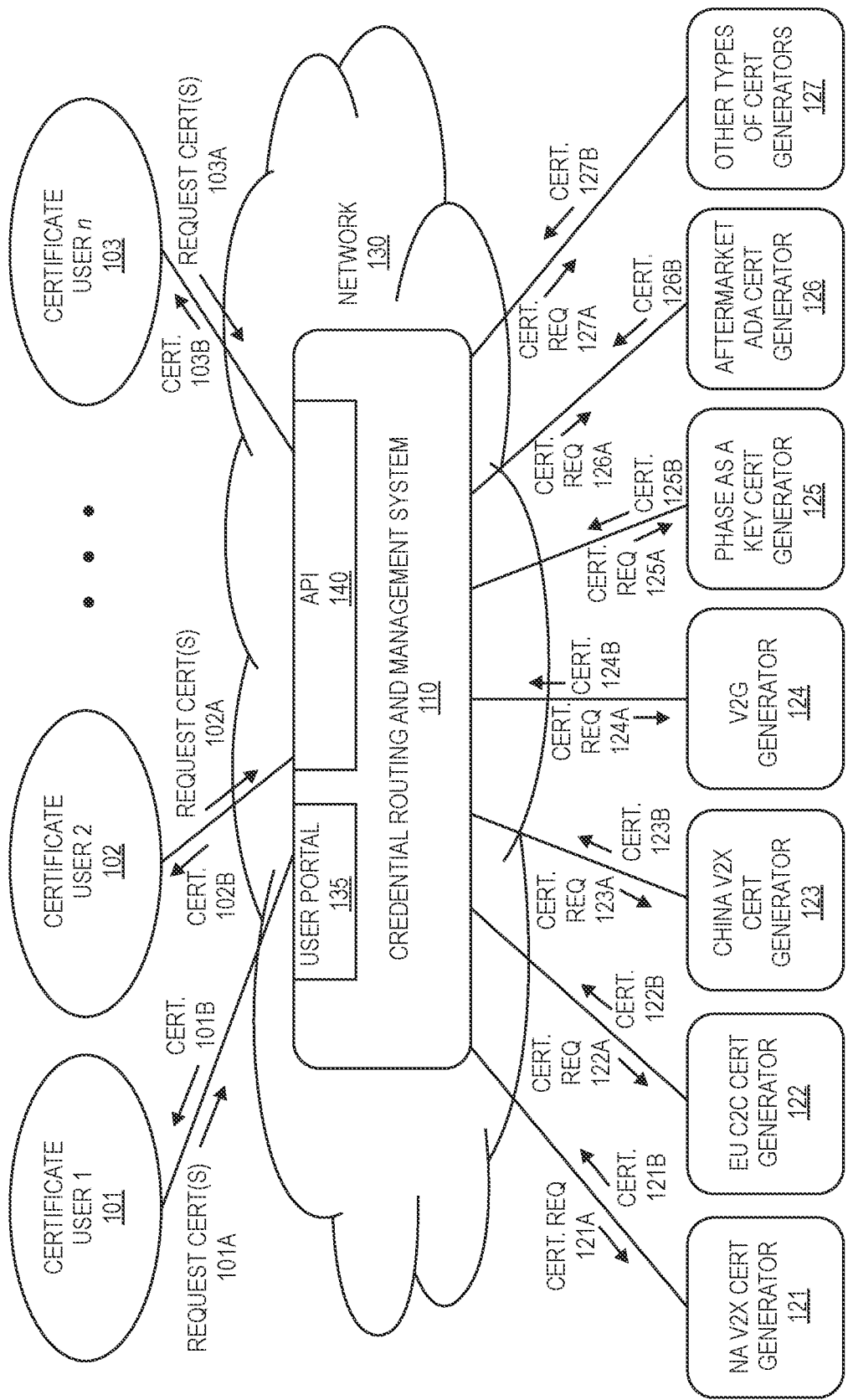
FIG. 1 is a block diagram showing an example of a system with centralized multiple digital asset (e.g., certificate) management capabilities, consistent with embodiments of the invention.

FIG. 1 is a block diagram showing an example of a system 100 with multiple digital asset (e.g., digital certificate or other security credential) generation and management capabilities, consistent with embodiments of the invention. As shown in this embodiment, the system 100 includes a credential (e.g., one type of digital asset) routing and management system 110, which may be implemented by a server (e.g., having at least one processor and associated memory)

or other computing system. As illustrated, the credential routing and management system 110 is accessible via a network 130, which may be or include a digital network(s), (e.g., the Internet), cellular networks, wireless networks, and other networks.

Any number of certificate users, such as the pictured certificate user 1 101, certificate user 2 102, and so on through certificate user n 103 may interact with the credential routing and management system 110 via the network 130. In various embodiments, a certificate user 101-103 may be, for instance, a device or system that uses certificates (e.g., an on-board unit device), or a computing system of a device manufacturer (e.g., an on-board unit manufacturer), or a person using a computer, among other things. Thus, further to the example mentioned above, a certificate user 101-103 may be the vehicle manufacturer that produces a new U.S. EV that needs V2X certificates and also needs a V2G certificate at manufacturing time. For another example, a certificate user 101-103 may be the new EV itself, which needs to replenish its V2X pseudonym certificates and needs to replace an expired or corrupted V2G certificate. Thus, a certificate user 101-103 is typically a computer or a computerized device, although in some instances it may be a person.

As shown in the example of FIG. 1, the credential routing and management system 110 may include a user portal 135, and a certificate user 101 may interact with the credential routing and management system 110 via the user portal 135. In some embodiments, the credential routing and management system 110 may include a human accessible interface, such as a human-specific user portal, for use by human users 101-103. Additionally or alternatively, the credential routing and management system 110 may include an application programming interface (API) 140, and a certificate user 102 may interact with the credential routing and management system 110 via the API 140. In some implementations (not shown), a user (e.g. user 101) may be able to interact with the credential routing and management system 110 via either of the portal 135 or the API 140. In general, the user portal 135 and the API 140 enable only a certificate users 101-103 who are known to and trusted by the credential routing and management system 110, (e.g., that have been registered, enrolled, or set up an account and been verified as legitimate security infrastructure users), to interact with the credential routing and management system 110. In some embodiments, a certificate user, e.g., 102, may provide a copy or the like of its enrollment credential(s) (e.g., V2X enrollment certificate, or its equivalent in other technical ecosystems) to the credential routing and management system 110, which may store the V2X enrollment credential for use when communicating with a V2X certificate generator (e.g., 121) on behalf of the certificate user 102 and according to the communication protocol employed by the V2X certificate generator 121. Enrollment credentials may include C2C enrollment certificates, V2G enrollment credentials, and the like.

Among the functions available to the certificate users 101-103 are the abilities to request 101A, 102A, 103A certificate(s) and to receive 101B, 102b, 103A certificate(s). For example, in operation, the certificate user 1 101 may send a request 101A for one or more certificates to the credential routing and management system 110, in this example, via the user portal 135. In some embodiments, the certificate user 101 may request more than one type of certificate and/or may request more than one type of certificate in a single request 101A. In some embodiments, the certificate user 101 using multiple, separate requests to accomplish the same thing. For example, the certificate user 101 may first send a request for a set of V2X pseudonym certificates and then send a second request for a V2G certificate. The requests may be for multiple devices (e.g., multiple new EVs) that need certificates or for a single device (e.g., on EV) that needs certificates.

Similarly, the other certificate users 102, 103 may each transmit or send various requests 102A, 103A for different numbers and types of certificates to the credential routing and management system 110 via, in this example, the API 140.

As shown in FIG. 1, the system also includes several digital asset (e.g., certificate) generators 121-127, which are communicatively connected to the credential routing and management system 110 via the network 130. In this example, the certificate generators include a North American (NA) V2X certificate generator 121, a European (EU) C2C certificate generator 122, a Chinese (CN) V2X certificate generator 123, a Vehicle to Grid (V2G) certificate generator 124, a phone-as-a-key certificate generator 125, an advanced driver assistance (ADA) certificate generator 126, and other types of certificate generators 127 that are known in the art. In some instances, the different types of certificates may be based on different types of public key infrastructures.

In some implementations, one or more of the certificate generators 121-127 may be a conventional security credential management system (SCMS) or the like. An SCMS is a message security solution for V2X communication. An SCMS may employ a PKI to enable trusted communication between the participants or elements of a V2X ecosystem. Authorized V2X ecosystem participants use digital certificates generated by an SCMS to authenticate and validate the safety and mobility messages for various connected-vehicle technologies and functions. To protect the privacy of vehicle owners and operators, the certificates typically contain no personal or equipment-identifying information but nonetheless serve as ecosystem credentials so that other users (e.g., devices) in the ecosystem can trust the source of each message. In some implementations, an SCMS may also include devices and functionality for identifying and removing misbehaving devices from the ecosystem, while still maintaining privacy.

In various embodiments, upon receiving a request for one or more certificates (or other type of security credential) from a certificate user, e.g., from the certificate user 101, the credential routing and management system 110 examines, interprets, parses, or otherwise analyzes the request 101A to determine the appropriate certificate generator 121-127 to which to route the request 101A. For example, in some implementations, the credential routing and management system 110 may analyze the data or information in the request 101A to determine the type of certificate(s) (e.g., North American V2X type, European C2C type, Phone-as-a-Key type, etc.) that the user 101 is requesting. This analyzing may be done, for example, by reading the data from a specific field(s) in the request message, and then using a lookup table, hard coding, or the like to determine the type of certificate that corresponds to the data from that field.

For another example, in some implementations, the request 101A may contain information (e.g., a field) identifying one of the certificate generators 121-127 to which the request 101A should be routed by the credential routing and management system 110, and the credential routing and management system 110 may use this generator-identity information to correctly route the request 101A. In some embodiments wherein the certificate user 101 has contracted or enrolled directly with one (or more) of the certificate generators 121-127, the generator-identity information in the request 101A may include information provided to the certificate user 101 by a specific certificate generator 121-127 at enrollment time.

Based on the type of certificate requested and/or the generator-identity information, the credential routing and management system 110 may then send, transmit, or otherwise provide a request to the digital asset provider 121-127 that generates or otherwise provides the type of certificate(s) that the user 101 requested. As noted below with regard to FIG. 2, in some embodiments, the credential routing and management system 110 may translate, reformat, or otherwise modify the request 101 into the format needed for operating with the specific certificate generator to which it is being routed. Additionally or alternatively, the credential routing and management system 110 may generate or create, based on the request 101A, a new request in the operable format needed by the specific certificate generator, wherein the new request is functionally equivalent to the request 101A. The transformation of the received certificate requests 101A, 102A, and 103A into a new format or the creation of a new request in the operable format needed by the specific certificate generator is represented in FIG. 1 by the certificate requests 121A, 122A, 123A, 124A, 125A, 126A, and 127A to the generators 121-127 having different reference numbers than 101A, 102A, and 103A, but it should be noted that in some cases and embodiments, a certificate request, e.g., 101A, may be in the exact format needed by the appropriate certificate generator 121-127, and in such cases the credential routing and management system 110 may route the original request (e.g., certificate request 101A) to the appropriate certificate generator without modification.

As a first example of general operation, consider the use case wherein the certificate user 101 sends a request 101A for a set of NA V2X certificates (e.g., a group of V2X pseudonym certificates or the like). In reaction, the credential routing and management system 110 may first analyze the data in the request 101A to determine that it is a request for a V2X type certificate, and then may create and send a certificate request 121A to the NA V2X Certificate Generator 121, wherein the request 121A is based on the information in the request 101A.

In response to the request 121A, the NA V2X Certificate Generator 121 creates or otherwise obtains and then provides the requested V2X certificates 121B to the credential routing and management system 110. Upon receiving the requested V2X certificates 121B from the NA V2X Certificate Generator 121, the credential routing and management system 110 may then transmit or otherwise provide the generated V2X certificates 121B (represented by the reference 101B) to the certificate user 101 that requested them.

Similarly, if the certificate user 101 later sends a request 101A for a V2G certificate, then the credential routing and management system 110 may analyze the data in the new request 101A to determine that it is a request for a V2G type certificate, and then may send a request 124A to the V2G Certificate Generator 124. Upon receiving the requested V2G certificate 124B from the V2G Certificate Generator 124, the credential routing and management system 110 may transmit or otherwise provide the requested V2G certificate (represented by the reference 101B) to the certificate user 101 that requested it.

One of ordinary skill will recognize that the components, connections, processes, data, operations, and implementation details shown in FIG. 1 are examples presented for conciseness and clarity of explanation. Other components, processes, implementation details, and variations may be used without departing from the principles of the invention, as this example is not intended to be limiting and many variations are possible. For instance, although only six specific types of certificate generators are shown in FIG. 1, other implementations may have many other types of certificate generators, as represented by component 127. For another instance, although FIG. 1 is described in the context of digital certificates, other implementations may include other types of digital assets, including software patches, software versions, and the like.

Figure 2:
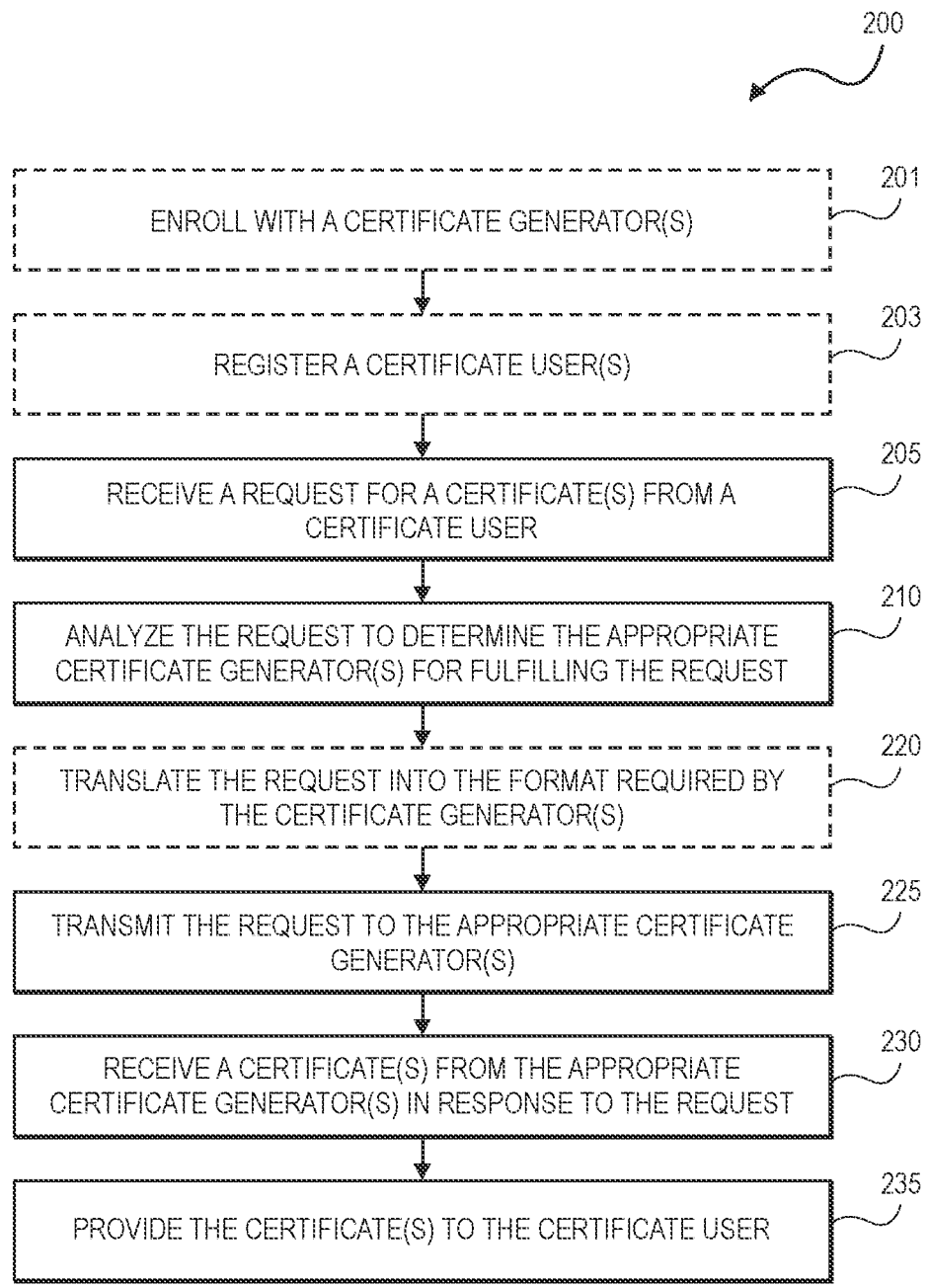
FIG. 2 is a flow chart illustrating an example of a method for managing and routing security credentials, consistent with implementations of the invention.

FIG. 2 is a flow chart illustrating an example of a method or process 200 for managing and routing security credentials, consistent with embodiments of the invention. Note that optional operations or functions for the embodiment shown are denoted by rectangles made of dashed lines. In various implementations, some or all of the process 200 or the operations shown may be performed by code (e.g., instructions) executing on a general purpose computing system (which may include one or more processors or one or more computing subsystems), by a hardware-only system, or by a system that is a hybrid of the two. In various implementations, some or all of the process 200 may be performed or executed by a credential routing and management system 110, which may be in communication with the certificate users 101-103 and the digital asset generators 121-127, as described with respect to FIG. 1 and throughout this disclosure.

As shown in the example of FIG. 2, the process 200 may begin at optional block 201 (e.g., optional operation) by enrolling or being enrolled with one or more certificate generators, such as one or more of the certificate generators 121-127. For example, in embodiments where a certificate generator, e.g., the NA V2X certificate generator 121, is implemented by a conventional SCMS, the credential routing and management system 110 may be enrolled with the V2X ecosystem by contracting with the provider (e.g., the SCMS) of the NA V2X certificate generator 121. Among other things, the provider may ensure that the security criteria that enrollees must meet to operate within their ecosystem are satisfied. Once authorized or enrolled, the credential routing and management system 110 will be considered a trusted actors in the V2X ecosystem. Additionally or alternatively, a certificate user(s) (e.g., 101-103) may be enrolled with one or more certificate generators, such that the user's certificate requests, including those managed by the credential routing and management system, will be honored by the generators with which the user is enrolled.

The process 200 may continue at 203 with registering a certificate user (e.g., 101-103). In various embodiments, a certificate user may be enrolled with the credential routing and management system 110 by contracting with the provider of the credential routing and management system 110. Among other things, the provider may ensure that the security criteria that enrollees must meet to operate within one or more of the ecosystem associated with the generators 121-127 are satisfied. Once authorized or enrolled, a user 101-103 will be considered a trusted actor in the technical ecosystem(s) for which it enrolled. As noted previously, in some implementations, a certificate user, e.g., 102, may provide a copy of its V2X enrollment certificate (or its equivalent in other technical ecosystems) to the credential routing and management system 110, which may store the enrollment certificate for use when communicating with a V2X certificate generator (e.g., 121) on behalf of the certificate user 102 and according to the communication protocol employed by the V2X certificate generator 121.

The process 200 continues at 205 with receiving a request (e.g. 101A-103A) for one or more certificate(s), where the request comes from a certificate user (e.g., 101-103), which may in some instances be a device, such as a vehicle or an on-board unit. In some implementations, the block 205 may involve a user 101-103 logging onto the credential routing and management system 110, for example, via a user portal (e.g., 135), and then entering the request 101A-103A. In some implementations, the block 205 may involve a user device 101-103 interacting with the API 140 of the credential routing and management system 110, to convey the request 101A-103A. As noted previously, a certificate user 101-103 may be any number of things, including a computing system of a manufacturer of devices that utilize certificates or a device (e.g. a V2X vehicle or a vehicle's subsystem (e.g., OBU) or a computerized device) that utilizes certificates.

In various implementations, a request 101A-103A may be for any number or types of digital certificates that come from any one or more of the certificate generators 121-127. For example, a request 101A-103A may be: for one digital certificate from a single generator (e.g., for a single CN V2X enrollment certificate), or for multiple digital certificates from a single generator (e.g., for a group of CN V2X pseudonym certificates), or for two or more single digital certificates that are produced by two or more different generators (e.g., for a for a single NA V2X enrollment certificate and a single V2G certificate), or for any other combinations of quantities and types of certificates. In some embodiments, a request 101A-103A may include an enrollment certificate(s) for the requesting user 101-103, which may be used in communications with a certificate generator (s), for example as described below.

At 210, the process 200 analyzes the request (e.g. 101A-103A) to determine the appropriate certificate generator(s) for fulfilling the request by generating or otherwise producing the requested digital certificates. In various embodiments, the request may include information that directly or indirectly identifies the appropriate certificate generator(s). For example, the request may include information or a field(s) (e.g., in accordance with the parameters and definitions of the API 140) that specifies the appropriate certificate generator(s). For another example, the request may include information that specifies the general type of certificate(s) that is being requested, and analyzing the request may include reading, parsing, or otherwise recognizing data or information in the request (e.g., data from a specific field in a data structure) that identifies the type of certificate that is desired. In such implementations, the process 200 may determine or select an appropriate certificate generator based on the type of certificate specified in the request. In such implementations, selecting the certificate generator may include looking up, retrieving, or otherwise identifying a specific generator from among the set of available generators 121-127 using the type of certificate as a search term, look-up key, index or the like.

At optional block 220, the process 200 may translate the request for the certificate from block 205 (e.g., 101A-103A) into a format that is usable by the certificate generator that was determined or selected in operation 210. In some such embodiments, a request 101A-103A may be in a format that is easily understood and usable by the credential routing and management system 110; for example, a format that speeds and simplifies the determination of the type of certificate that is being requested (e.g., operation 210) and the routing of the request, and this request format may not be compatible with the selected certificate generator. In such cases, the operation 220 may convert, reformat, or otherwise translate the received request 101A-103A into a request (e.g., 121A-127A) that is compatible with the selected appropriate certificate generator, as needed. In some embodiments, the process 200 may create from scratch a new request (e.g., 121A . . . 127A) for the selected appropriate certificate generator using information from the request (e.g., 101A-103A) received at block 205.

At 225, the process 200 transmits, routes, or otherwise provides the (possibly translated) request (e.g., 121A-127A) to the appropriate certificate generator that was determined in block 210. As just noted, the request to the certificate generator may optionally be reformatted before being sent.

In various embodiments, some or all of the certificate generators 121-127 may employ communication protocols that are different from each other; e.g. the protocol for requesting (e.g. 121A) and receiving (e.g., 121B) certificates from the NA V2X certificate generator 121 is different from the protocol for requesting (e.g., 124A) and receiving (e.g., 124B) certificates from the V2G certificate generator 124. In such embodiments, the process 200 (e.g., as implemented by the credential routing and management system 110) employs the corresponding protocol associated with each of the certificate generators 121-127 when communicating with each. In implementations where the process 200 has access to an enrollment certificate (or the like) of the requesting certificate user 101-103, (e.g., as previously stored by the credential routing and management system 110 or as received in a request 101A-103A), the process may employ the enrollment certificate when communicating with the corresponding certificate generator (e.g., 121 for a V2X enrollment certificate) per the communication protocol, such that the credential routing and management system 110 acts as a proxy for the requesting certificate user 101-103, and the certificate generator 121 responds as if it is interacting with the enrollment certificate holder device (e.g., 101-103).

Upon receiving the request (e.g., 121A-127A) that was sent from the credential routing and management system 110, the certificate generator 121-127 processes the request and generates, calculates, retrieves, or otherwise produces a certificate(s) (e.g., 121B-127B, which is one type of digital asset or security credential) according to the request, and sends the certificate(s) (e.g., 121B-127B) to the credential routing and management system 110.

At 230, the process 200 receives one or more certificate(s) (e.g., 121B-127B) from the certificate generator that was selected in operation 215 and to which the request was transmitted in operation 225.

At 235, the process 200 transmits or otherwise provides the certificate(s) (e.g., 101B-103B) to the requesting entity (e.g., to the certificate user 101-103 that sent the request 101A-103A).

The example depicted in FIG. 2 is only for the purpose of illustration and is not intended to be limiting. Further, the depicted process 200 is an example that has been somewhat simplified for clarity of explanation of certain novel and innovative features consistent with certain disclosed implementations, but this example is not intended to be limiting and many variations are possible. For example, for clarity, the process 200 is described in the context of a certificate-user request (e.g., 102A) that is routed to a single generator (e.g., 121) because the certificate-user request is for a single type of certificate (e.g., a NA V2X certificate), but a certificate-user request (e.g., 102A) that included sub-request for several types of certificates (e.g., NA V2X certificate, V2G certificates, and after-market ADA certificates) would have the sub-requests routed to the three appropriate generators (e.g., 121, 124, and 126).

While the functions and operations are shown as being performed in a particular order, the order described is merely an example, and various different sequences of blocks or operations can be performed, consistent with certain disclosed implementations. Moreover, the operations are described as discrete steps merely for the purpose of explanation, and, in some implementations, multiple operations may be performed simultaneously and/or as part of a single computation or larger operation. The operations described are not intended to be exhaustive, limiting, or absolute, and various operations can be modified, inserted, or removed.

Other variations are possible. As an example of a variation, although FIG. 2 is described in the context of a digital certificate, the systems and processes consistent with this disclosure can function similarly to handle other types of digital assets (e.g., software patches, application versions, etc.).

Figure 3:
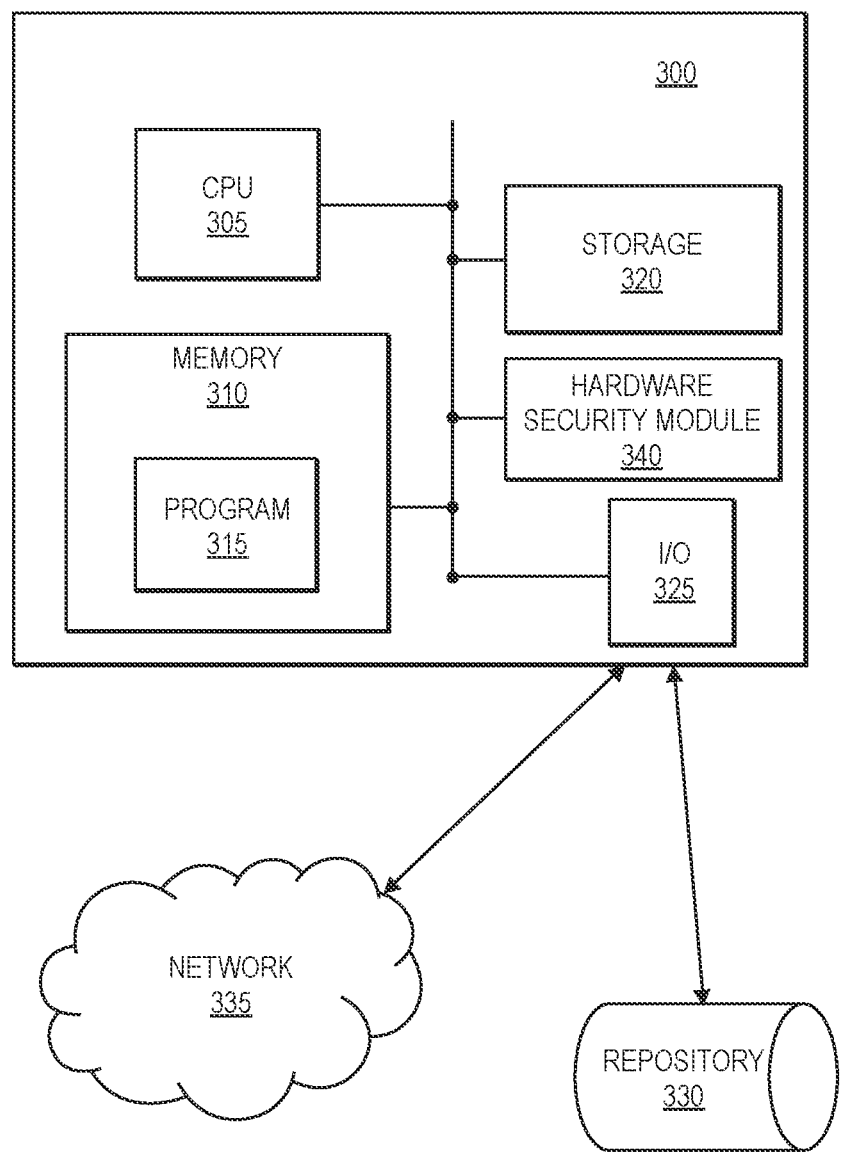
FIG. 3 is a block diagram of an example of a computing system that may be used for hosting and implementing systems and methods consistent with implementations of the invention.

FIG. 3 is a block diagram of an example of a computing environment which includes a computing system 300 that may be used for implementing systems and methods consistent with implementations of the invention. Other components and/or arrangements may also be used. In some implementations, computing system 300 may be used to implement, at least partially, various components, devices, blocks, functions, and operations of FIGS. 1-2, such as the credential management and routing system 110, among other things. In some implementations, a series of computing systems similar to computing system 300 may be each customized with specialized hardware and/or programmed as a specialized server to implement one of the components or blocks of FIGS. 1-2, which may communicate with each other via a network 335.

In the example shown in FIG. 3, the computing system 300 includes a number of components, such as a CPU 305, a memory 310, an input/output (I/O) device(s) 325, a hardware security module (HSM) 340, and a storage device 320. System 300 can be implemented in various ways. For example, an implementation as an integrated platform (such as a server, workstation, personal computer, laptop, etc.) may comprise a CPU 305, a memory 310, a nonvolatile storage 320, and I/O devices 325. In such a configuration, the components 305, 310, 320, and 325 may connect and communicate through a local data bus and may access a data repository 330 (implemented, for example, as a separate database system) via an external I/O connection. The I/O component(s) 325 may connect to external devices through a direct communication link (e.g., a hardwired or local wifi connection), through a network, such as a local area network (LAN) or a wide area network (WAN, such as a cellular telephone network or the Internet), and/or through other suitable connections. System 300 may be stand-alone, or it may be a subsystem of a larger system.

The CPU 305 may be one or more known processor or processing devices, such as a microprocessor from the Core™ family manufactured by the Intel™ Corporation of Santa Clara, CA or a microprocessor from the Athlon™ family manufactured by the AMD™ Corporation of Sunnyvale, CA. The memory 310 may be one or more fast storage devices configured to store instructions and information executed or used by the CPU 305 to perform certain functions, methods, and processes related to implementations of the present invention. The storage 320 may be a volatile or non-volatile, magnetic, semiconductor, tape, optical, or other type of storage device or computer-readable medium, including devices such as CDs and DVDs and solid state devices, meant for long-term storage.

In the illustrated implementation, the memory 310 contains one or more instructions, programs or applications 315 loaded from the storage 320 or from a remote system (not shown) that, when executed by the CPU 305, perform various operations, procedures, processes, or methods consistent with the present invention. Alternatively, the CPU 305 may execute one or more programs located remotely from the system 300. For example, the system 300 may access one or more remote programs via the network 335 that, when executed, perform functions and processes related to implementations of the present invention.

In one implementation, the memory 310 may include a program(s) 315 for performing the specialized functions and operations described herein for the credential management and routing system 110. In some implementations, the memory 310 may also include other programs or applications that implement other methods and processes that provide ancillary functionality to the invention.

The memory 310 may also be configured with other programs (not shown) unrelated to the invention and/or an operating system (not shown) that performs several functions well known in the art when executed by the CPU 305. By way of example, the operating system may be Microsoft Windows™, Unix™, Linux™, an Apple Computers™ operating system, or another operating system. The choice of operating system, and even to the use of an operating system, is not critical to the invention.

The HSM 340 may be a device with its own processor that securely manages digital security assets and/or securely performs a variety of cryptographic and sensitive computations. In some embodiments, the HSM 340 protects digital security assets, such as cryptographic keys and digital certificates, and other sensitive data from possible access by an attacker. In some implementations, the HSM may be a plug-in card or board that attaches directly to the computing system 300.

The I/O device(s) 325 may comprise one or more input/output devices that allow data to be received and/or transmitted by the system 300. For example, the I/O device 325 may include one or more input devices, such as a keyboard, touch screen, mouse, and the like, that enable data to be input from a user. Further, the I/O device 325 may include one or more output devices, such as a display screen, a CRT monitor, an LCD monitor, a plasma display, a printer, speaker devices, and the like, that enable data to be output or presented to a user. The I/O device 325 may also include one or more digital and/or analog communication input/output devices that allow the computing system 300 to communicate, for example, digitally, with other machines and devices. Other configurations and/or numbers of input and/or output devices may be incorporated in the I/O device 325.

In the implementation shown, the system 300 is connected to a network 335 (such as the Internet, a private network, a virtual private network, a cellular network or other network or combination of these), which may in turn be connected to various systems and computing machines, such as servers, personal computers, laptop computers, client devices, etc. In general, the system 300 may input data from external machines and devices and output data to external machines and devices via the network 335. In some implementations, the network 335 may be, or be part of, the network 130.

In the exemplary implementation shown in FIG. 3, the data repository 330 is a standalone database external to system 300, such as the database 125. In other implementations, the data repository 330 may be hosted by the system 300. In various implementations, the data repository 330 may manage and store data used to implement systems and methods consistent with the invention. For example, the data repository 330 may manage and store data structures that are used by the credential management and routing system 110.

The data repository 330 may comprise one or more databases that store information and are accessed and/or managed through the system 300. By way of example, the database 330 may be an Oracle™ database, a Sybase™ database, or other relational database. Systems and methods consistent with the invention, however, are not limited to separate data structures or databases, or even to the use of a database or data structure.

One of ordinary skill will recognize that the components and implementation details of the system in FIG. 3 are examples presented for conciseness and clarity of explanation. Other components and implementation details may be used.

Although the examples of FIGS. 1-3 are described in the context of road vehicles and V2X/C2X ecosystems for clarity of explanation, other embodiments consistent with the invention can be used in the context of aircraft and aircraft ecosystems (including drones and drone ecosystems), as well as in other ecosystems with devices that utilize trusted communications based on security credentials, such as digital certificates. Other examples include ecosystems for medical devices (e.g., dialysis machines, infusion pumps, etc.); robots; autonomous vehicles; and secure voice and digital communications, among others.

The various operations of the applications described herein may be performed, at least partially, by one or more virtual machines (VMs). In additional or alternative implementations, the operations of the applications described herein may be performed, at least partially by one or more processors that are temporarily configured (e.g., by software) or permanently configured to perform the relevant operations. Whether temporarily or permanently configured, such processors may constitute processor-implemented modules that operate to perform one or more application operations, functions, and roles described herein. As used herein, the term 'processor-implemented module' refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within an office environment, a manufacturing environment, or a server farm). In other example embodiments, the processors or processor-implemented modules may be distributed across a number of geographic locations.

What is claimed is:

1. A system for managing digital certificates, the system comprising:
   a routing and management system that is communicatively connected to a plurality of certificate generators, and that is operable to perform operations comprising:
   receiving a request for one or more digital certificates for a certificate user device;
   analyzing the request to determine an appropriate certificate generator, from among the plurality of certificate generators, for producing the one or more digital certificates;
   translating the request into a format required by the appropriate certificate generator;
   transmitting the translated request to the appropriate certificate generator;
   receiving the one or more digital certificates from the appropriate certificate generator; and
   providing the one or more digital certificates to an entity that sent the request for one or more digital certificates.

2. The system of claim 1, wherein analyzing the request to determine an appropriate certificate generator comprises analyzing the request and determining a plurality of appropriate certificate generators;
   wherein translating the request into a format required by the appropriate certificate generator comprises translating the request into a plurality of formats required by the plurality of appropriate certificate generators;
   wherein transmitting the translated request to the appropriate certificate generator comprises transmitting the plurality of translated requests to the plurality of appropriate certificate generators; and
   wherein receiving the one or more digital certificates from the appropriate certificate generator comprises receiving one or more digital certificates from the plurality of appropriate certificate generators.

3. The system of claim 1, wherein the certificate user device is a vehicle.

4. The system of claim 3, wherein the entity that sent the request for one or more digital certificates is the vehicle.

5. The system of claim 1, wherein analyzing the request to determine an appropriate certificate generator comprises analyzing a field of the received request to determine the appropriate certificate generator.

6. The system of claim 5, wherein the field specifies a type of certificate.

7. The system of claim 1, wherein transmitting the translated request to the appropriate certificate generator comprises employing an appropriate communications protocol to send the translated request.

8. The system of claim 1, wherein transmitting the translated request to the appropriate certificate generator comprises transmitting the translated request utilizing an enrollment certificate.

9. The system of claim 1, further comprising:
   enrolling, by the routing and management system, with at least one of the plurality of certificate generators; and
   receiving, from the at least one of the plurality of certificate generators, an enrollment certificate for the routing and management system.

10. The system of claim 9, wherein transmitting the translated request to the appropriate certificate generator comprises transmitting the translated request utilizing the enrollment certificate for the routing and management system.

11. A method for managing digital certificates using a routing and management system that is communicatively connected to a plurality of certificate generators, the method comprising:
- receiving, by the routing and management system, a request for one or more digital certificates for a certificate user device;
- analyzing, by the routing and management system, the request to determine an appropriate certificate generator, from among the plurality of certificate generators, for producing the one or more digital certificates;
- translating, by the routing and management system, the request into a format required by the appropriate certificate generator;
- transmitting, by the routing and management system, the translated request to the appropriate certificate generator;
- receiving, by the routing and management system, the one or more digital certificates from the appropriate certificate generator; and
- providing, by the routing and management system, the one or more digital certificates, to an entity that sent the request.

12. The method of claim 11, wherein analyzing the request to determine an appropriate certificate generator comprises analyzing the request and determining a plurality of appropriate certificate generators;
- wherein translating the request into a format required by the appropriate certificate generator comprises translating the request into a plurality of formats required by the plurality of appropriate certificate generators;
- wherein transmitting the translated request to the appropriate certificate generator comprises transmitting the plurality of translated requests to the plurality of appropriate certificate generators; and
- wherein receiving the one or more digital certificates from the appropriate certificate generator comprises receiving one or more digital certificates from the plurality of appropriate certificate generators.

13. The method of claim 11, wherein the certificate user device is a vehicle.

14. The method of claim 13, wherein the entity that sent the request for the one or more digital certificates is the vehicle.

15. The method of claim 11, wherein analyzing the request to determine an appropriate certificate generator comprises analyzing a field of the received request to determine the appropriate certificate generator.

16. The method of claim 15, wherein the field specifies a type of certificate.

17. The method of claim 11, wherein transmitting the translated request to the appropriate certificate generator comprises employing an appropriate communications protocol to send the translated request.

18. The method of claim 11, wherein transmitting the translated request to the appropriate certificate generator comprises transmitting the translated request utilizing an enrollment certificate.

19. The method of claim 11, further comprising:
- enrolling, by the routing and management system, with at least one of the plurality of certificate generators; and
- receiving, from the at least one of the plurality of certificate generators, an enrollment certificate for the routing and management system.

20. The method of claim 19, wherein transmitting the translated request to the appropriate certificate generator comprises transmitting the translated request utilizing the enrollment certificate for the routing and management system.

21. A non-transitory computer-readable medium including instructions that, when executed by a processor, perform a method for managing digital certificates, the method comprising:
- receiving a request for one or more digital certificates for a certificate user device;
- analyzing the request to determine an appropriate certificate generator, from among a plurality of certificate generators, for producing the one or more digital certificates;
- translating the request into a format required by the appropriate certificate generator;
- transmitting the translated request to the appropriate certificate generator;
- receiving the one or more digital certificates from the appropriate certificate generator; and
- providing the one or more digital certificates to an entity that sent the request for one or more digital certificates.

22. The non-transitory computer-readable medium of claim 21, wherein analyzing the request to determine an appropriate certificate generator comprises analyzing the request and determining a plurality of appropriate certificate generators;
- wherein translating the request into a format required by the appropriate certificate generator comprises translating the request into a plurality of formats required by the plurality of appropriate certificate generators;
- wherein transmitting the translated request to the appropriate certificate generator comprises transmitting the plurality of translated requests to the plurality of appropriate certificate generators; and
- wherein receiving the one or more digital certificates from the appropriate certificate generator comprises receiving one or more digital certificates from the plurality of appropriate certificate generators.

23. The non-transitory computer-readable medium of claim 21, wherein the certificate user device is a vehicle.

24. The non-transitory computer-readable medium of claim 23, wherein the entity that sent the request for one or more digital certificates is the vehicle.

25. The non-transitory computer-readable medium of claim 21, wherein analyzing the request to determine an appropriate certificate generator comprises analyzing a field of the received request to determine the appropriate certificate generator.

26. The non-transitory computer-readable medium of claim 25, wherein the field specifies a type of certificate.

27. The non-transitory computer-readable medium of claim 21, wherein transmitting the translated request to the appropriate certificate generator comprises employing an appropriate communications protocol to send the translated request.

28. The non-transitory computer-readable medium of claim 21, wherein transmitting the translated request to the appropriate certificate generator comprises transmitting the translated request utilizing an enrollment certificate.

29. The non-transitory computer-readable medium of claim 21, further comprising:
- enrolling with at least one of the plurality of certificate generators; and
- receiving, from the at least one of the plurality of certificate generators, an enrollment certificate.

30. The non-transitory computer-readable medium of claim 29, wherein transmitting the translated request to the appropriate certificate generator comprises transmitting the translated request utilizing the enrollment certificate that was received.

* * * * *